United States Patent
Fan et al.

(10) Patent No.: US 12,328,140 B2
(45) Date of Patent: Jun. 10, 2025

(54) MEASUREMENT APPARATUS AND METHOD FOR NONLINEAR DAMAGES IN OPTICAL LINK

(71) Applicant: Fujitsu Limited, Kawasaki (JP)

(72) Inventors: Yangyang Fan, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 18/181,937

(22) Filed: Mar. 10, 2023

(65) Prior Publication Data
US 2023/0327759 A1 Oct. 12, 2023

(30) Foreign Application Priority Data
Mar. 24, 2022 (CN) .......................... 202210294309.0

(51) Int. Cl.
*H04B 10/079* (2013.01)
*G01M 11/00* (2006.01)

(52) U.S. Cl.
CPC ..... *H04B 10/07953* (2013.01); *G01M 11/333* (2013.01); *H04B 10/07955* (2013.01)

(58) Field of Classification Search
CPC .... H04B 10/07–0799; H04B 10/07953; H04B 10/07955; G01M 11/30–338; G01M 11/333
USPC ....................................................... 398/9–38
See application file for complete search history.

(56) References Cited

U.S. PATENT DOCUMENTS

| 4,608,647 | A | * | 8/1986 | White | G01R 29/26 |
| | | | | | 455/115.2 |
| 6,570,394 | B1 | * | 5/2003 | Williams | H04N 17/00 |
| | | | | | 324/620 |
| 2017/0117983 | A1 | * | 4/2017 | Al Sayeed | H04B 10/07955 |
| 2022/0070044 | A1 | * | 3/2022 | Vaquero-Caballero | |
| | | | | | H04B 1/1027 |

FOREIGN PATENT DOCUMENTS

CN    111125897 A    5/2020

OTHER PUBLICATIONS

Vaquero-Caballero: "Transceiver Noise Characterization based on Perturbations", Journal of Lightwave Technology, vol. 39, No. 18, Sep. 15, 2021, pp. 5799-5804 (Year: 2021).*

(Continued)

*Primary Examiner* — Li Liu
(74) *Attorney, Agent, or Firm* — STAAS & HALSEY LLP

(57) ABSTRACT

Embodiments of this disclosure provide a measurement apparatus and method for nonlinear damages in an optical link. The apparatus may include a processor to control execution of a process to generate multiple band-notch signals with different band-notch widths corresponding to a frequency point to be measured; and calculate respective multiple nonlinear noise-to-power ratios at the frequency point to be measured according to multiple band-notch signals obtained after the multiple band-notch signals with different band-notch widths pass through the optical link. A real nonlinear noise-to-power ratio may be extrapolated at the frequency point to be measured according to the multiple nonlinear noise-to-power ratios corresponding to the multiple band-notch signals with different band-notch widths.

10 Claims, 10 Drawing Sheets

(56) References Cited

OTHER PUBLICATIONS

Ronald W. Koch; "Random Signal Method of Nonlinear Amplitude Distortion Measurement"; IEEE Transactions on Instrumentation and Measurement, vol. IM-20, No. 2, May 1971; 95-99; (5 pages).

Jose Carlos Pedro et al.; "Characterizing Nonlinear RF Circuits for Their In-Band Signal Distortion"; IEEE Transaction on Instrumentation and Measurement, vol. 51, No. 3, Jun. 2002; 420-426; (7 pages).

Walt Kester; "Noise Power Ratio (NPR)—A 65-Year Old Telephone System Specification Finds New Life in Modern Wireless Applications"; Analog Devices MT-005 Tutorial; Rev. A/10/08, WK; 1-12; (12 pages).

Xiaofei Su et al.; "Accurate Performance Estimation for Nonlinear System"; 26$^{th}$ Optoelectronics and Communications Conference (OECC) 2021; downloaded Mar. 1, 2023; (3 pages).

Khaled M. Gharaibeh; "Nonlinear Distortion in Wireless Systems, Modeling and Simulation with Matlab"; 2012; ISBN 978-0-470-66104-8; (355 pages).

Alain Geens et al.; "Discussion on Fundamental Issues of NPR Measurements"; IEEE Transactions on Instrumentation and Measurement, vol. 52, No. 1, Feb. 2003; 197-202; (6 pages).

\* cited by examiner

MEASUREMENT APPARATUS AND METHOD FOR NONLINEAR DAMAGES IN OPTICAL LINK

CROSS-REFERENCE TO RELATED APPLICATIONS

This application claims priority under 35 USC 119 to Chinese patent application no. 202210294309.0, filed on Mar. 24, 2022, in the China National Intellectual Property Administration, the entire contents of which are incorporated herein by reference.

TECHNICAL FIELD

This disclosure relates to the field of communication technologies.

BACKGROUND

An optical communication system usually increases a transmission distance by increasing transmission optical power. However, enhancement of optical power will lead to enhancement of nonlinear damages of an optical link, i.e. an optical fiber, resulting in degradation of received signals, thereby limiting a transmission distance of the optical link in the optical communication system. Therefore, measurement of nonlinear damages in the optical link is helpful to optimize a system design to improve transmission performances. Signal degradation caused by the nonlinear damages in the optical link may be characterized by a nonlinear noise-to-signal ratio or a nonlinear noise-to-power ratio (NPR).

In existing methods, by transmitting a band-notch signal at a transmitter end, received power may be measured at an output end of the optical link or an output end of a receiver and the nonlinear noise-to-power ratio may be calculated. As a main difference between the nonlinear damage and a linear damage is that the nonlinear damage will generate new spectral components in a frequency domain and the nonlinear damage will cause a change of depth of a received band notch, the nonlinear noise-to-power ratio may be measured via the change of the depth of the band notch of the received signal at a measuring end.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that there exists a relatively large deviation between the nonlinear noise-to-power ratio measured in the existing method and a real nonlinear noise-to-power ratio.

And it was further found by the inventors after study that the nonlinear noise-to-power ratio in the optical link is related to a band-notch width of a transmitted band-notch signal, and the narrower the band-notch width of the band-notch signal, the closer a measurement result is to the real nonlinear noise-to-power ratio. However, when a band-notch signal with a very narrow band-notch width is used, on the one hand, the measurement accuracy will be affected by background noises of the optical communication system, and on the other hand, resolution of a spectrometer is required to be very high. Moreover, signals with band-notch signals always have certain band-notch widths. Even though a band-notch width of a band-notch signal is very narrow, its measurement result is still unable to reflect the real nonlinear noise-to-power ratio.

In order to solve at least one of the above problems, embodiments of this disclosure provide a measurement apparatus and method for nonlinear damages in an optical link, in which multiple nonlinear noise-to-power ratios are calculated according to multiple band-notch signals obtained after multiple band-notch signals with different band-notch widths pass through the optical link, and a nonlinear noise-to-power ratio corresponding to a band-notch width of zero, i.e. a real nonlinear noise-to-power ratio, may be obtained by extrapolation based on multiple nonlinear noise-to-power ratios corresponding to multiple band-notch signals with different band-notch widths. Hence, the real nonlinear noise-to-power ratio in the optical link may be accurately measured with a simple method and existing instruments and equipments.

According to a first aspect of the embodiments of this disclosure, there is provided a measurement apparatus for nonlinear damages in an optical link, the apparatus including: a first generating unit configured to generate multiple band-notch signals with different band-notch widths corresponding to a frequency point to be measured; a first calculating unit configured to respectively calculate multiple nonlinear noise-to-power ratios at the frequency points to be measured according to multiple band-notch signals obtained after the multiple band-notch signals with different band-notch widths pass through the optical link; and an extrapolation unit configured to extrapolate a real nonlinear noise-to-power ratio at the frequency point to be measured according to the multiple nonlinear noise-to-power ratios corresponding to the multiple band-notch signals with different band-notch widths.

According to a second aspect of the embodiments of this disclosure, there is provided an apparatus for estimating performance of a nonlinear system, the apparatus including: the measurement apparatus for nonlinear damages in an optical link described in the first aspect of the embodiments of this disclosure, to obtain real nonlinear noise-to-power ratios at frequency points to be measured; a modeling unit configured to establish an equivalent additive noise model according to the real nonlinear noise-to-power ratios at the frequency points to be measured; and an estimation unit configured to estimate the performance of the nonlinear system according to the equivalent additive noise model.

According to a third aspect of the embodiments of this disclosure, there is provided an electronic device, including the apparatus described in the first or second aspect of the embodiments of this disclosure.

According to a fourth aspect of the embodiments of this disclosure, there is provided a measurement method for nonlinear damages in an optical link, the method including: generating multiple band-notch signals with different band-notch widths corresponding to a frequency point to be measured; respectively calculating multiple nonlinear noise-to-power ratios at the frequency point to be measured according to multiple band-notch signals obtained after the multiple band-notch signals with different band-notch widths pass through the optical link; and extrapolating a real nonlinear noise-to-power ratio at the frequency point to be measured according to the multiple nonlinear noise-to-power ratios corresponding to the multiple band-notch signals with different band-notch widths.

An advantage of the embodiments of this disclosure exists in that multiple nonlinear noise-to-power ratios are calculated according to multiple band-notch signals obtained after multiple band-notch signals with different band-notch widths pass through the optical link, and a nonlinear noise-to-power ratio corresponding to a band-notch width of zero, i.e. a real nonlinear noise-to-power ratio, may be obtained by extrapolation based on multiple nonlinear noise-to-power ratios corresponding to multiple band-notch signals with different band-notch widths. Hence, the real nonlinear noise-to-power ratio in the optical link may be accurately measured with a simple method and existing instruments and equipments.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of this disclosure provides a measurement apparatus for nonlinear damages in an optical link.

In some embodiments, the measurement apparatus for nonlinear damages in an optical link may be provided at an output end of the optical link.

Figure 1:
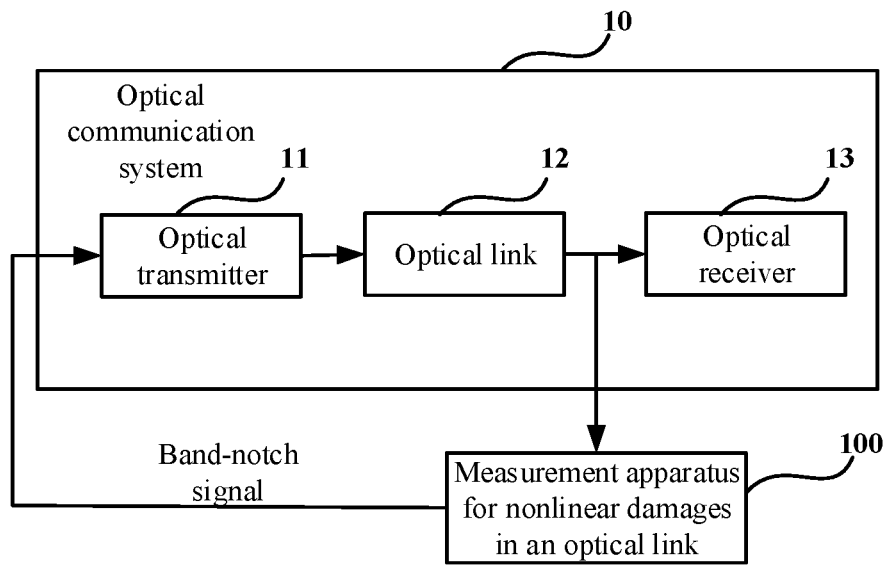
FIG. 1 is a schematic diagram of measuring nonlinear damages of an optical communication system of embodiment 1 of this disclosure.

FIG. 1 is a schematic diagram of measuring nonlinear damages of an optical communication system of embodiment 1 of this disclosure. As shown in FIG. 1, an optical communication system 10 includes an optical transmitter 11, an optical link 12 and an optical receiver 13. A measurement apparatus 100 for nonlinear damages in the optical link generates a band-notch signal, which is transmitted by the transmitter 11 and is received by the optical receiver 13 after being transmitted by the optical link 12. The measurement apparatus 100 for nonlinear damages in the optical link measures the signal passing through the optical link 12 to obtain a nonlinear optical damage in the optical link 12, for example, the nonlinear damage is represented by a nonlinear noise-to-power ratio.

Figure 2:
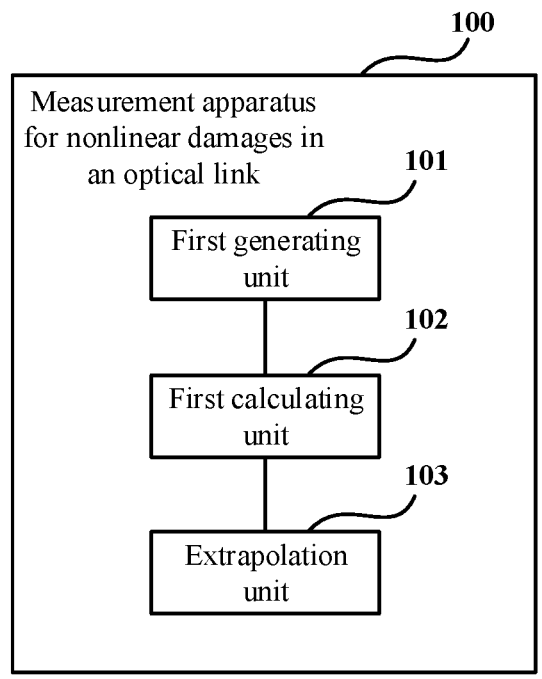
FIG. 2 is a schematic diagram of the measurement apparatus for nonlinear damages in an optical link of embodiment 1 of this disclosure.

FIG. 2 is a schematic diagram of the measurement apparatus for nonlinear damages in an optical link of embodiment 1 of this disclosure. As shown in FIG. 2, a measurement apparatus 100 for nonlinear damages in the optical link may include a first generating unit 101 configured to generate multiple band-notch signals with different band-notch widths corresponding to a frequency point to be measured; a first calculating unit 102 configured to respectively calculate multiple nonlinear noise-to-power ratios at the frequency point to be measured according to multiple band-notch signals obtained after the multiple band-notch signals with different band-notch widths pass through the optical link; and an extrapolation unit 103 configured to extrapolate a real nonlinear noise-to-power ratio at the frequency point to be measured according to the multiple nonlinear noise-to-power ratios corresponding to the multiple band-notch signals with different band-notch widths.

In some embodiments, the frequency point to be measured includes at least one frequency point, and when there exist multiple frequency points to be measured, real nonlinear noise-to-power ratios at the frequency points to be measured are measured respectively.

In some embodiments, when a frequency spectrum of the band-notch signal includes multiple band-notches, the multiple band-notches may correspond to multiple frequency points to be measured. That is, according to the band-notch signal, real nonlinear noise-to-power ratios at multiple frequency points to be measured may be measured at one time.

In some embodiments, the band-notch signal refers to a signal with a notch in a frequency spectrum.

In some embodiments, the band-notch width refers to a width of a band-notch in a band-notch signal, that is, a width in a frequency domain.

In some embodiments, multiple band-notch signals with different band-notch widths refer to at least two band-notch signals with different band-notch widths, and a specific number thereof may be determined according to an actual situation. The more band-notch signals with different band-notch widths, the easier it is to extrapolate the real nonlinear noise-to-power ratio at the frequency point to be measured, but the more procedures for processing.

The first generating unit 101 generates multiple band-notch signals with different band-notch widths corresponding to the frequency points to be measured. These band-notch signals with different band-notch widths are measurement signals.

In some embodiments, the band-notch widths of the band-notch signals generated by the first generating unit 101 each time are different, and specific values of these band-notch widths may be determined according to an actual situation.

In some embodiments, the band-notch widths are not less than a spectral resolution of a spectrometer used for measurement.

In some embodiments, a signal transmitted by the optical transmitter 11 of the optical communication system 10 includes an I-path and a Q-path, and the two paths of signals are combined to form a complex signal I+jQ.

In some embodiments, the first generating unit 101 may perform band-notch processing on the transmission signal on the I-path and Q-path respectively to generate a bilateral band-notch signal, that is, there exist band-notches at both sides of the frequency domain.

In some embodiments, the bilateral band-notch signal may include a band-notch corresponding to a frequency point to be measured, or may include multiple frequency points to be measured. When multiple frequency points to be measured are included, the nonlinear noise-to-power ratios at multiple frequency points to be measured may be measured in one time by transmitting a band-notch signal.

Figure 3:
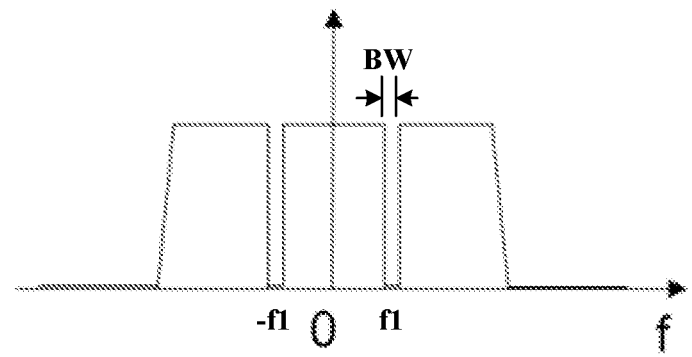
FIG. 3 is a schematic diagram of a bilateral band-notch signal of embodiment 1 of this disclosure.
Figure 4:
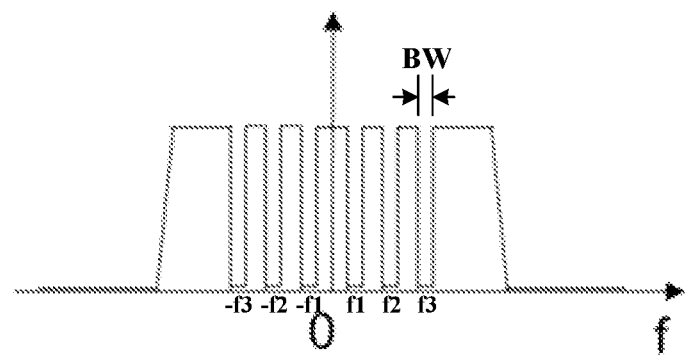
FIG. 4 is another schematic diagram of the bilateral band-notch signal of embodiment 1 of this disclosure.

FIG. 3 is a schematic diagram of the bilateral band-notch signal of embodiment 1 of this disclosure, and FIG. 4 is another schematic diagram of the bilateral band-notch signal of embodiment 1 of this disclosure.

As shown in FIG. 3, the bilateral band-notch signal has band-notches at both sides of the frequency domain, which correspond to frequency points −f1 and f1 to be measured, and its band-notch width is BW.

As shown in FIG. 4, the bilateral band-notch signal has three band-notches on both sides of the frequency domain, which correspond to frequency points −f1, −f2, −f3 and f1, f2, f3 to be measured, and its band-notch width is BW.

In some embodiments, the first generating unit 101 may also perform band-notch processing on the complex signal I+jQ to generate a unilateral band-notch signal, that is, there exists a band-notch on one side of the frequency domain.

In some embodiments, at a frequency domain side, the unilateral band-notch signal may include a band-notch corresponding to a frequency point to be measured, or may also include multiple frequency points to be measured. When multiple frequency points to be measured are included, the nonlinear noise-to-power ratios at multiple frequency points to be measured may be measured in one time of transmitting a band-notch signal.

Figure 5:
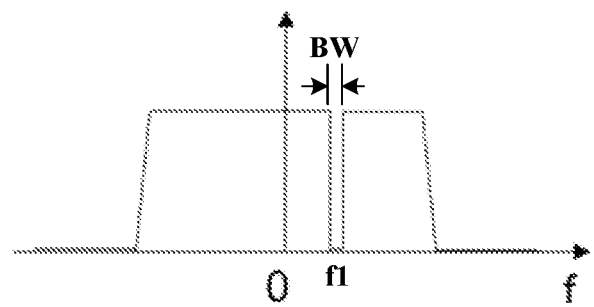
FIG. 5 is a schematic diagram of a unilateral band-notch signal of embodiment 1 of this disclosure.
Figure 6:
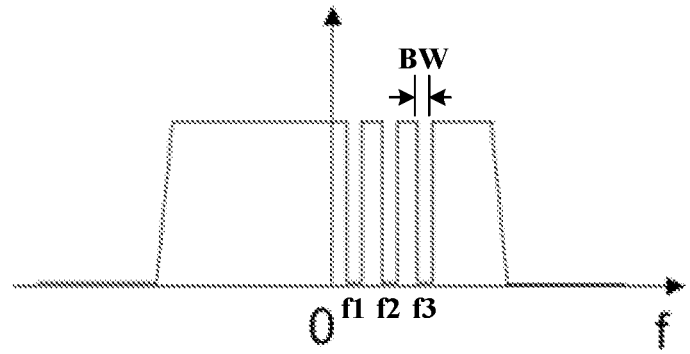
FIG. 6 is another schematic diagram of the unilateral band-notch signal of embodiment 1 of this disclosure.

FIG. 5 is a schematic diagram of the unilateral band-notch signal of embodiment 1 of this disclosure, and FIG. 6 is another schematic diagram of the unilateral band-notch signal of embodiment 1 of this disclosure.

As shown in FIG. 5, the unilateral band-notch signal has a band-notch at a side of the frequency domain, which corresponds to frequency point f1 to be measured, and its band-notch width is BW.

As shown in FIG. 6, the unilateral band-notch signal has three band-notches at a side of the frequency domain, which correspond to frequency points f1, f2 and f3 to be measured, and its band-notch width is BW.

In some embodiments, the first generating unit 101 may generate a band-notch signal at the frequency point to be measured in a waveform domain or a symbol domain.

Generation of the band-notch signal in the waveform domain or the symbol domain shall be illustrated below.

Figure 7:
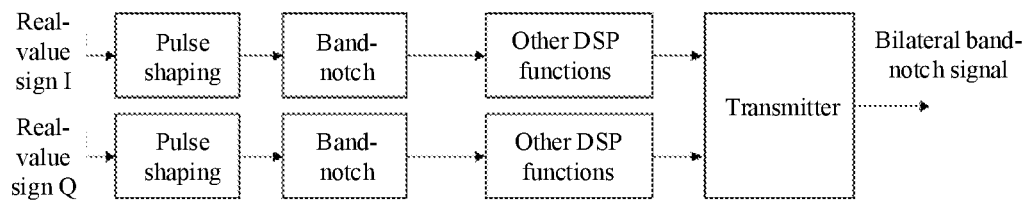
FIG. 7 is a flowchart of generating a bilateral band-notch signal in a waveform domain of embodiment 1 of this disclosure.
Figure 8:
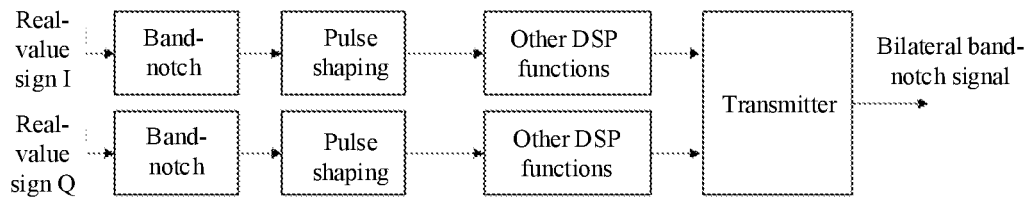
FIG. 8 is a flowchart of generating a bilateral band-notch signal in a symbol domain of embodiment 1 of this disclosure.

FIG. 7 is a flowchart of generating a bilateral band-notch signal in the waveform domain of embodiment 1 of this disclosure, and FIG. 8 is a flowchart of generating a bilateral band-notch signal in the symbol domain of embodiment 1 of this disclosure.

Figure 9:
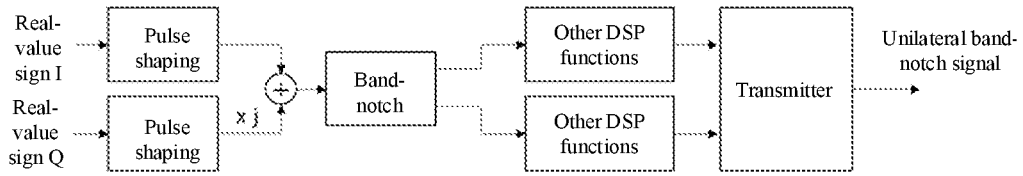
FIG. 9 is a flowchart of generating a unilateral band-notch signal in the waveform domain of embodiment 1 of this disclosure.
Figure 10:
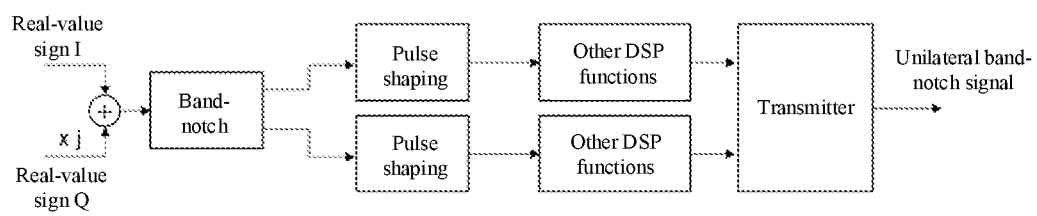
FIG. 10 is a flowchart of generating a unilateral band-notch signal in the symbol domain of embodiment 1 of this disclosure.

FIG. 9 is a flowchart of generating a unilateral band-notch signal in the waveform domain of embodiment 1 of this disclosure, and FIG. 10 is a flowchart of generating a unilateral band-notch signal in the symbol domain of embodiment 1 of this disclosure.

As shown in FIG. 7 and FIG. 9, a band-notch after pulse shaping is referred to as a waveform domain band-notch, as shown in FIG. 8 and FIG. 10. Before pulse shaping, a band-notch acting on an input sign is referred to as a symbol domain band-notch.

The first generating unit 101 may perform band notch in multiple ways.

Figure 11:
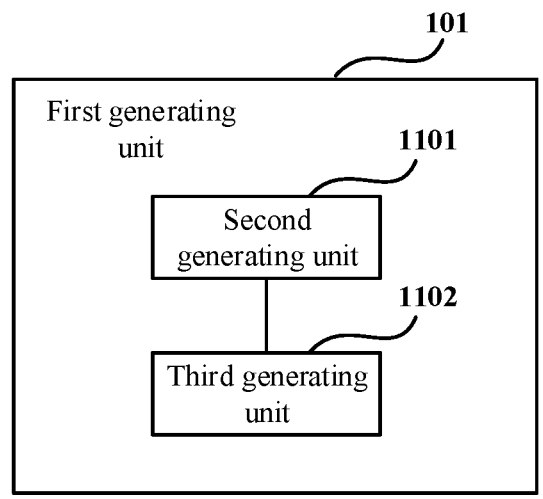
FIG. 11 is a schematic diagram of the first generating unit of embodiment 1 of this disclosure.

FIG. 11 is a schematic diagram of the first generating unit of embodiment 1 of this disclosure. As shown in FIG. 11, the first generating unit 101 may include a second generating unit 1101 configured to remove signals in a part of a range of frequency spectrum to generate the band-notch signal; or a third generating unit 1102 configured to generate the band-notch signal by equal probability notch processing.

In some embodiments, the second generating unit 1101 generates the band-notch signal by removing signals in part of the spectrum range, which is equivalent to passing the signal through a band-stop filter.

In some embodiments, the third generating unit 1102 generates the band-notch signal by equal probability notch processing.

Figure 12:
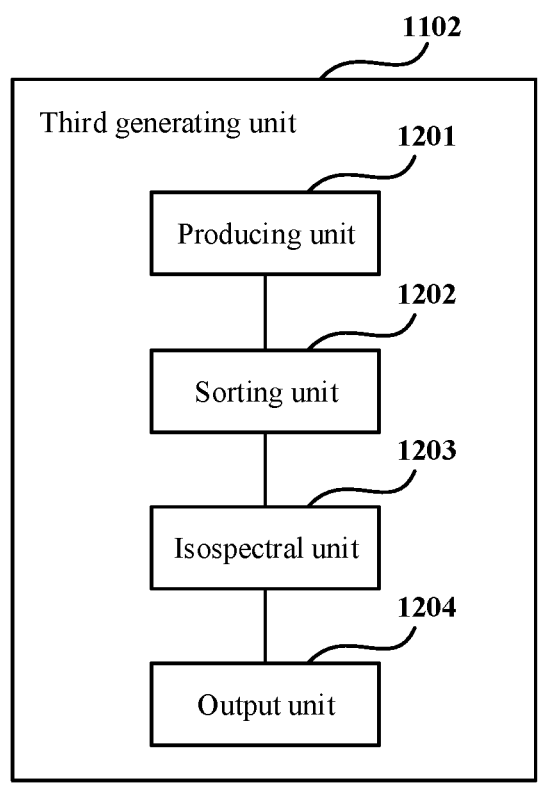
FIG. 12 is a schematic diagram of the third generating unit of embodiment 1 of this disclosure.

FIG. 12 is a schematic diagram of the third generating unit of embodiment 1 of this disclosure. The third generating unit 1102 may include a producing unit 1201 configured to make a probability distribution density of the band notch processed signal in a time domain close to or identical to a reference signal while producing a band notch at a spectrum; a sorting unit 1202 configured to construct signals of identical probability distribution densities by performing amplitude sorting, amplitude replacement and time sorting on the reference signal and an initialized seed signal; an isospectral unit 1203 configured to construct an isospectral signal by slicing the spectrum and making total power within each slice equal to power of a corresponding reference signal slice; and an output unit 1204 configured to output the band-notch signal when a preset condition is satisfied.

In some embodiments, the generating unit 1201, the sorting unit 1202 and the isospectral unit 1203 iteratively process, until the preset conditions are met, the output unit 1204 outputs the band-notch signal.

In some embodiments, the preset condition is, for example, that a similarity of a probability distribution density reaches a preset threshold.

In this way, the band-notch signal with equal spectrum and probabilities may be generated, thereby further improving accuracy of measurement results.

In some embodiments, when it is needed to measure a nonlinear NPR for a dual-polarization system, for each polarization state of a dual-polarization signal, one of the above methods for generating band-notch signals may be selected for both; or, one of the above methods for generating band-notch signals is selected for only one polarization state, and the other polarization state transmits signals with no band-notch.

In some embodiments, for an I-path and Q-path of a single polarization signal or for four paths of a dual polarization signal, signals of the paths are uncorrelated. In addition, the two polarization states of the dual-polarization signal have equal power.

The first generating unit 101 generates multiple band-notch signals with different band-notch widths corresponding to the frequency point to be measured, and the first calculating unit 101 respectively calculates multiple nonlinear noise-to-power ratios at the frequency point to be measured according to multiple band-notch signals obtained after the multiple band-notch signals with different band-notch widths pass through the optical link, that is, for the band-notch signals with different band-notch widths generated by the first generating unit 101, the first calculating unit 101 performs processing respectively, and obtains a nonlinear noise-to-power ratio corresponding to a band-notch width in each time of processing.

Figure 13:
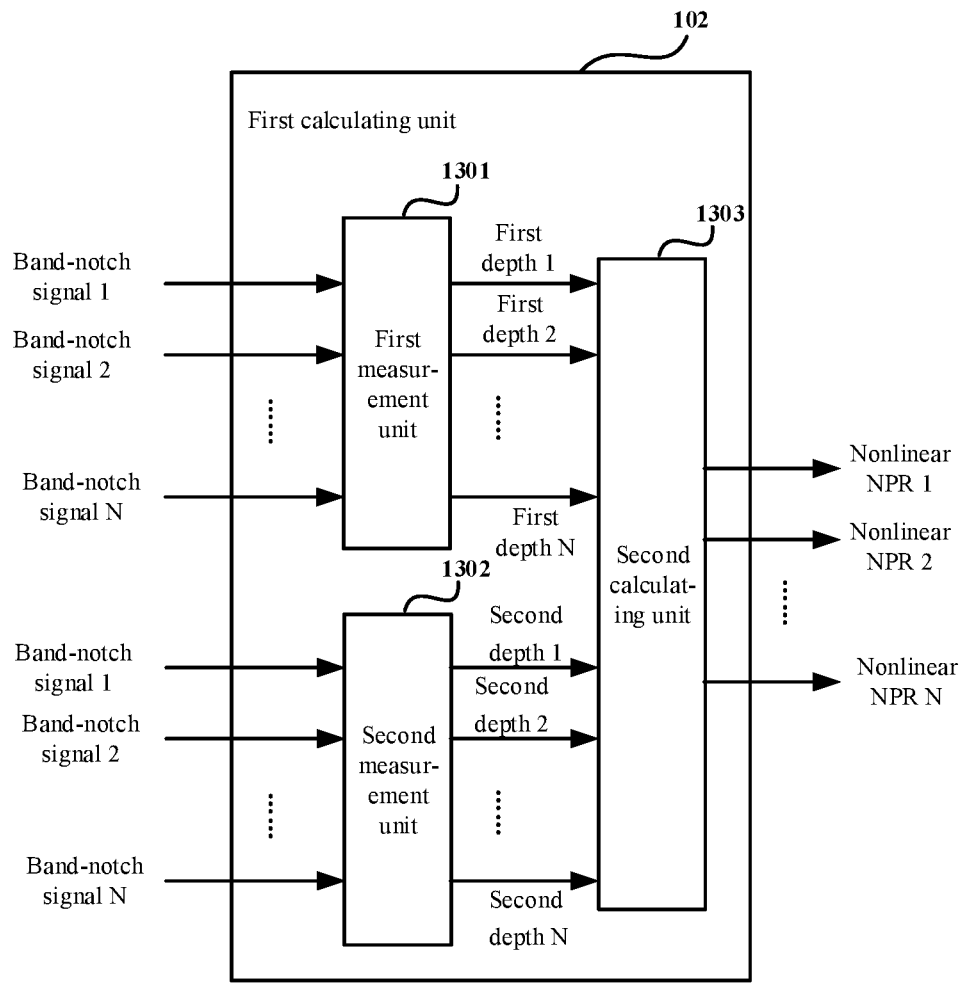
FIG. 13 is a schematic diagram of the first calculating unit of embodiment 1 of this disclosure.

FIG. 13 is a schematic diagram of the first calculating unit of embodiment 1 of this disclosure. As shown in FIG. 13, the first calculating unit 102 may include a first measurement unit 1301 configured to measure multiple first depths of the multiple band-notch signals obtained after the multiple band-notch signals with different band-notch widths pass through the optical link at transmit power satisfying a linear transmission condition; a second measurement unit 1302 configured to measure multiple second depths of the multiple band-notch signals obtained after the multiple band-notch signals with different band-notch widths pass through the optical link at transmit power to be measured; and a second calculating unit 1303 configured to respectively calculate the multiple nonlinear noise-to-power ratios at the frequency point to be measured according to the multiple first depths and the multiple second depths.

In some embodiments, the first generating unit 101 generates N band-notch signals with different band-notch widths, and after the band-notch signals are transmitted by the optical transmitter 11 and transmitted via the optical link 12, N band-notch signals are obtained for measurement of a nonlinear noise-to-power ratio, that is, band-notch signal 1, band-notch signal 2, . . . , band-notch signal N, N being a positive integer greater than 1.

For the first measurement unit 1301, it measures at transmission power satisfying a linear transmission condition, that is, the optical transmitter 11 transmits N band-notch signals with different band-notch widths at the transmission power satisfying the linear transmission condition, and after the band-notch signals are transmitted via the optical link 12, N band-notch signals are obtained, i.e. band-notch signal 1, band-notch signal 2, . . . , band-notch signal N shown in FIG. 13 are inputted into the first measurement unit 1301 for calculation to obtain first depths of N band-notch signals, i.e. first depth 1, first depth 2, . . . , first depth N. For example, the first measurement unit 1301 performs calculation by measuring a power spectrum of a received signal with a spectrometer.

In some embodiments, the transmission power satisfying the linear transmission condition is relatively small, and will not cause a nonlinear damage.

In some embodiments, the band-notch widths of the N band-notch signals with different band-notch widths are BW1, BW2, . . . , BWN, respectively, and first depth 1, first depth 2, . . . , first depth N outputted by the first measurement unit 1301 correspond respectively to the band widths BW1, BW2, . . . , and BWN.

For the second measurement unit 1302, it performs measurement at transmission power be measured, that is, the optical transmitter 11 transmits N band-notch signals with different band-notch widths at transmission power identical to the transmission power to be measured, and N band-notch signals are obtained after the band-notch signals are transmitted via the optical link 12, i.e. band-notch signal 1, band-notch signal 2, . . . , band-notch signal N shown in FIG. 13 are inputted into the first measurement unit 1302 for calculation, and second depths of N band-notch signals are obtained, i.e. second depth 1, second depth 2, . . . , second depth N. For example, the second measurement unit 1302 performs calculation by measuring a power spectrum of a received signal with a spectrometer.

In some embodiments, the transmission power to be measured may cause a nonlinear damage. In addition, a size of nonlinear damage, that is, a size of the nonlinear NPR, is related to the transmission power. Therefore, the second measurement unit 1302 transmits the band-notch signal by using the transmission power to be measured.

In some embodiments, the band-notch widths of the N band-notch signals with different band-notch widths are BW1, BW2, . . . , BWN, respectively, and second depth 1, second depth 2, . . . , second depth N outputted by the first measurement unit 1301 correspond respectively to band widths BW1, BW2, . . . , and BWN.

In some embodiments, the first depth and the second depth refer to the band-notch depths.

In some embodiments, the first depth represents a depth of a noise floor in the optical link, the second depth represents a depth of the noise floor plus a nonlinear noise in the optical link, and the nonlinear NPR may be calculated according to a difference therebetween.

In some embodiments, the band-notch depth is defined as a ratio of average power at a bottom of the band-notch to average power of signals at the band-notch, and it may be in a unit of dB.

In some embodiments, the second calculating unit 1303 respectively calculates the multiple nonlinear noise-to-power ratios at the frequency point to be measured according to multiple first depths and multiple second depths. For example, the second calculating unit 1303 calculates nonlinear NPR 1 according to first depth 1 and second depth 1, calculates nonlinear NPR 2 according to first depth 2 and second depth 2, . . . , and calculates nonlinear NRP N according to first depth N and second depth N.

In some embodiments, methods for calculating the band-notch depth of the unilateral band-notch signal and the bilateral band-notch signal are similar, with a difference that the unilateral band-notch signal does not have a positive and negative symmetrical frequency, and the calculation of the band-notch depth thereof does not need to take a positive frequency and a negative frequency into account, while for the bilateral band-notch signal, the calculation of the band-notch depth thereof takes both a positive frequency and a negative frequency into account. Reference may be made to relevant technologies for a specific calculation method.

For example, taking the bilateral band-notch as an example, the first depth may be calculated according to formula (1) as below:

$$NPR_0 = 10*\log 10\left(\frac{P_{n-}+P_{n+}}{(P_{s-,l}+P_{s-,r}+P_{s+,l}+P_{s+,r})/2}\right); \quad (1)$$

where, $NPR_0$ denotes the first depth, $P_{n-}$ and $P_{n+}$ are power of the bilateral band-notch at the symmetrical positive frequency and negative frequency, respectively, $P_{s-,l}$ and $P_{s-,r}$ denote signal power at both sides of the band-notch in negative frequency, $P_{s+,l}$ and $P_{s+,r}$ denote signal power at both sides of the band-notch in positive frequency.

Figure 14:
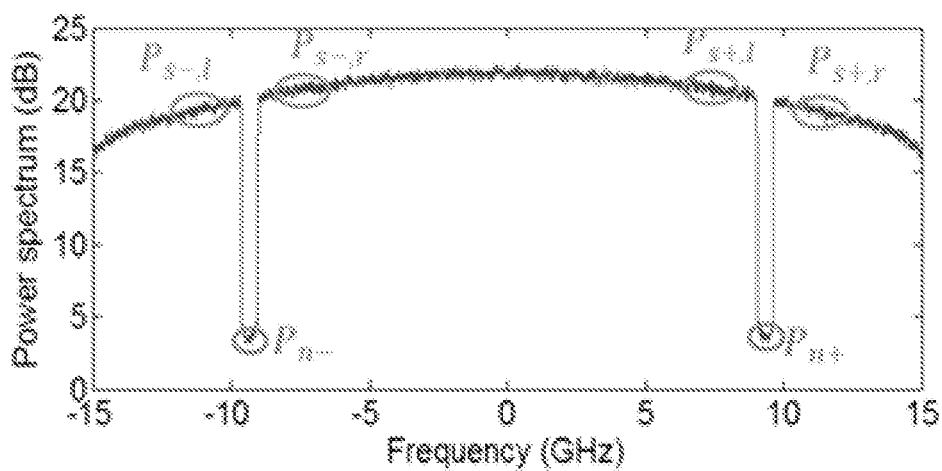
FIG. 14 is a schematic diagram of calculating a band-notch depth of embodiment 1 of this disclosure.

FIG. 14 is a schematic diagram of calculating the band-notch depth of embodiment 1 of this disclosure. As shown in FIG. 14, $P_{n-}$ and $P_{n+}$ are power of the bilateral band-notch at the symmetrical positive frequency and negative frequency, respectively, $P_{s-,l}$ and $P_{s-,r}$ denote signal power at both sides of the band-notch in negative frequency, which are used to estimate the signal power at the band-notch in negative frequency, $P_{s+,l}$ and $P_{s+,r}$ denote signal power at both sides of the band-notch in positive frequency, which are used to estimate the signal power at the band-notch in positive frequency.

Similar to the method for calculating the second depth, for example, the first depth may be calculated according to formula (2) as below:

$$NPR_1 = 10*\log 10\left(\frac{P_{n-}+P_{n+}}{(P_{s-,l}+P_{s-,r}+P_{s+,l}+P_{s+,r})/2}\right); \quad (2)$$

where, $NPR_1$ denotes the second depth, $P_{n-}$ and $P_{n+}$ are power of the bilateral band-notch at the symmetrical positive frequency and negative frequency, respectively, $P_{s-,l}$ and $P_{s-,r}$ denote signal power at both sides of the band-notch in negative frequency, $P_{s+,l}$ and $P_{s+,r}$ denote signal power at both sides of the band-notch in positive frequency.

After calculating the first depth and the second depth, for example, the nonlinear noise-to-power ratio may be calculated according to formula (3) as below:

$$NPR_{NL}(BW_n, f_i) = 10*\log 10\left[10^{\frac{NPR_1(BW_n,f_i)}{10}} - 10^{\frac{NPR_0(BW_n,f_i)}{10}}\right]; \quad (3)$$

where, $NPR_{NL}(BW_n, f_i)$ denotes a nonlinear noise-to-power ratio of the optical link at the frequency point $f_i$ to be measured corresponding to a band-notch width of $BW_n$, $NPR_1(BW_n, f_i)$ denotes a second depth at the frequency point $f_i$ to be measured corresponding to the band-notch width of $BW_n$, and $NPR_0(BW_n, f_i)$ denotes a first depth at the frequency point $f_i$ to be measured corresponding to the band-notch width of $BW_n$.

In some embodiments, for a coherent optical communication system, within measurement period of the first measurement unit 1301 and the second measurement unit 1302, a change of a local oscillator frequency offset of a coherent optical receiver is far less than the band-notch width, and a characteristic of a phase noise of a laser is also unchanged.

Figure 15:
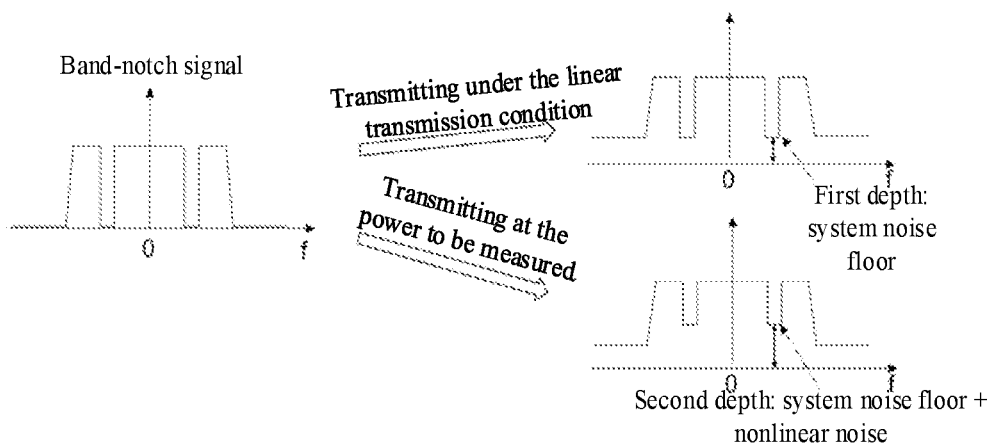
FIG. 15 is a schematic diagram of measuring a nonlinear noise-to-power ratio of embodiment 1 of this disclosure.

FIG. 15 is a schematic diagram of measuring the nonlinear noise-to-power ratio of embodiment 1 of this disclosure. As shown in FIG. 15, the first depth is measured by transmitting the band-notch signal at the power satisfying the linear transmission condition, the second depth is measured by transmitting the band-notch signal at the power to be measured, and the nonlinear noise-to-power ratio is obtained through calculation according to the first depth and the second depth.

After the first calculating unit 102 calculates multiple nonlinear noise-to-power ratios corresponding to the multiple band-notch signals with different band-notch widths, the extrapolation unit 103 extrapolates the real nonlinear noise-to-power ratio at the frequency point to be measured according to the multiple nonlinear noise-to-power ratios.

In some embodiments, the extrapolation may also be referred to as external interpolation, which is to interpolate the nonlinear noise-to-power ratio outside the band width range used for measurement.

In some embodiments, the real nonlinear noise-to-power ratio refers to a nonlinear noise-to-power ratio when the band-notch width is 0.

In some embodiments, for example, multiple nonlinear noise-to-power ratios are fitted, and an intersection of a fitting line and an ordinate with a band-notch width of zero is taken as the real nonlinear noise-to-power ratio.

Figure 16:
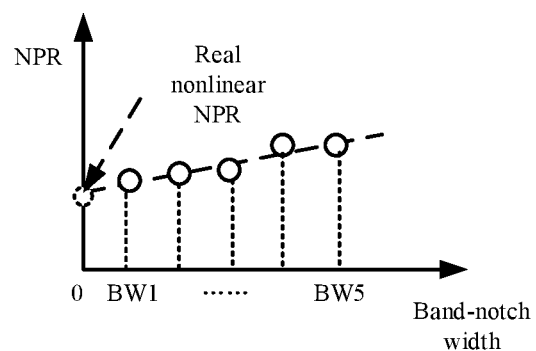
FIG. 16 is a schematic diagram of extrapolating a real nonlinear noise-to-power ratio of embodiment 1 of this disclosure.

FIG. 16 is a schematic diagram of extrapolating a real nonlinear noise-to-power ratio of embodiment 1 of this disclosure. As shown in FIG. 16, at a frequency point to be measured, fitting is performed according to the nonlinear noise-to-power ratios corresponding to the band-notch widths BW1, BW2, . . . , BW5, and the intersection of the fitting line and the ordinate when the band-notch width is 0 is taken as the real nonlinear noise-to-power ratio (NPR).

In some embodiments, the above measurement process may be repeated by generating the band-notch signal by changing the frequency point corresponding to the band-notch, that is, nonlinear noise-to-power ratios at other frequency points to be measured may be measured in the above method. In this way, nonlinear noise-to-power ratios at all frequency points to be measured may be obtained.

In some embodiments, in a dual-polarization system, the apparatus 100 generates band-notch signals in two polarization states for a dual-polarization signal according to the above method, and calculates real nonlinear noise-to-power ratios of the two polarization states at the frequency point to be measured. In this way, it may be applicable to the dual-polarization system.

It can be seen from the above embodiment that multiple nonlinear noise-to-power ratios are calculated according to multiple band-notch signals obtained after multiple band-notch signals with different band-notch widths pass through the optical link, and a nonlinear noise-to-power ratio corresponding to a band-notch width of zero, i.e. a real nonlinear noise-to-power ratio, may be obtained by extrapolation based on multiple nonlinear noise-to-power ratios corresponding to multiple band-notch signals with different band-notch widths. Hence, the real nonlinear noise-to-power ratio in the optical link may be accurately measured with a simple method and existing instruments and equipments.

Embodiment 2

The embodiment of this disclosure further provides an apparatus for estimating performance of a nonlinear system.

Figure 17:
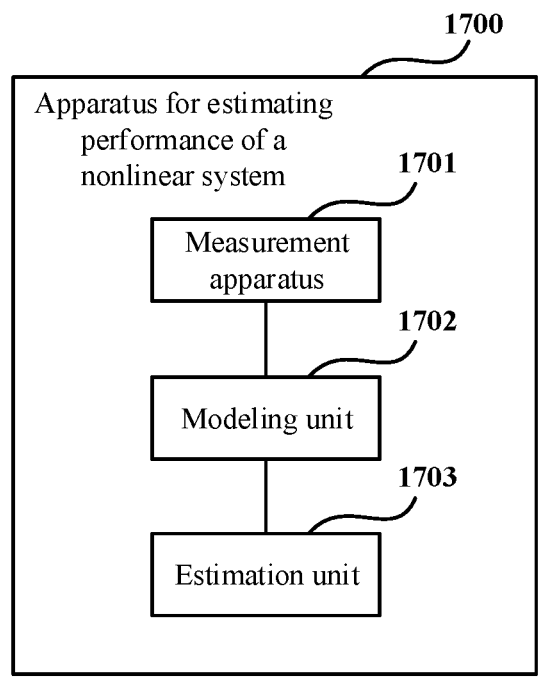
FIG. 17 is a schematic diagram of the apparatus for estimating performance of a nonlinear system of embodiment 2 of this disclosure.

FIG. 17 is a schematic diagram of the apparatus for estimating performance of a nonlinear system of embodiment 2 of this disclosure. As shown in FIG. 17, an apparatus 1700 for estimating performance of a nonlinear system may include a measurement apparatus 1701 for nonlinear damages in an optical link configured to obtain real nonlinear noise-to-power ratios at frequency points to be measured; a modeling unit 1702 configured to establish an equivalent additive noise model according to the real nonlinear noise-to-power ratios at the frequency points to be measured; and an estimation unit 1703 configured to estimate the performance of the nonlinear system according to the equivalent additive noise model.

In some embodiments, the measurement apparatus 1701 for nonlinear damages in an optical link is identical to that in embodiment 1, which shall not be repeated herein any further.

The modeling unit 1702 establishes the equivalent additive noise model according to the real nonlinear noise-to-power ratios at the frequency points to be measured. The equivalent additive noise model includes an equivalent linear model and an equivalent nonlinear noise model, and reference may be made to relevant technologies for a specific construction method thereof.

In some embodiments, the nonlinear system is, for example, an optical communication system, or a part of an optical communication system.

Figure 18:
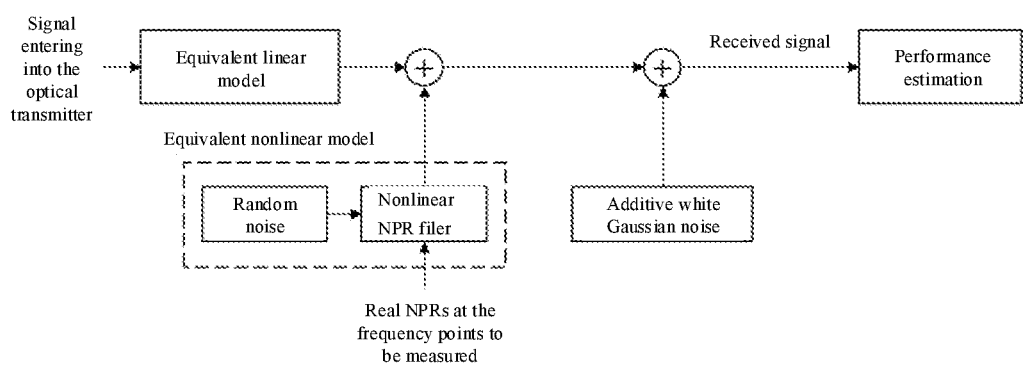
FIG. 18 is a schematic diagram of a process of estimating performance of the nonlinear system of embodiment 2 of this disclosure.

FIG. 18 is a schematic diagram of a process of estimating performance of the nonlinear system of embodiment 2 of this disclosure. As shown in FIG. 18, real NRPs at the frequency points to be measured and a random noise are inputted into a signal outputted from a nonlinear NPR filter, are superimposed with a signal obtained after a signal inputted into the optical transmitter passes through the equivalent linear model, and then it is superimposed with an additive white Gaussian noise to obtain a received signal for performance estimation. Reference may be made to relevant technologies for a specific estimation method, which shall not be repeated herein any further.

It can be seen from the above embodiment that the equivalent additive noise model may be established by obtaining the real nonlinear noise-to-power ratios at the frequency points to be measured, thereby accurately estimating the system performance.

Embodiment 3

Figure 19:
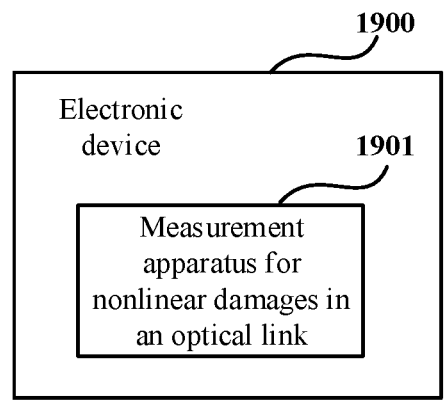
FIG. 19 is a schematic diagram of the electronic device of embodiment 3 of this disclosure.

The embodiment of this disclosure provides an electronic device. FIG. 19 is a schematic diagram of the electronic device of embodiment 3 of this disclosure. As shown in FIG. 19, an electronic device 1900 includes a measurement apparatus 1901 for nonlinear damages in an optical link. A structure and function of the measurement apparatus 1901 for nonlinear damages in an optical link are identical to those in embodiment 1, which shall not be repeated herein any further.

Figure 20:
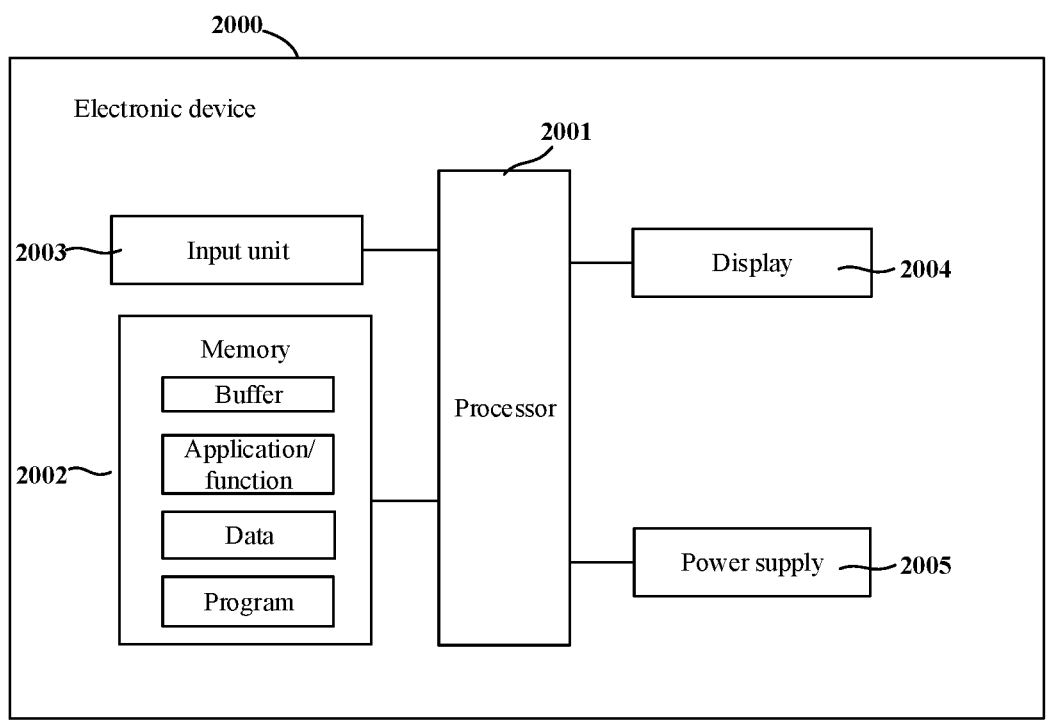
FIG. 20 is a block diagram of a systematic structure of the electronic device of embodiment 3 of this disclosure.

FIG. 20 is a block diagram of a systematic structure of the electronic device of embodiment 3 of this disclosure. As shown in FIG. 20, an electronic device 2000 may include a processor 2001 and a memory 2002, the memory 2002 being coupled to the processor 2001. This figure is illustrative only, and other types of structures may also be used, so as to supplement or replace this structure and achieve a telecommunications function or other functions.

As shown in FIG. 20, the electronic device 2000 may further include an input unit 2003, a display 2004, and a power supply 2005.

In one embodiment, the function of the measurement apparatus for nonlinear damages in an optical link described in embodiment 1 may be integrated into the processor 2001. The processor 2001 may be configured to: generate multiple band-notch signals with different band-notch widths corresponding to a frequency point to be measured; respectively calculate multiple nonlinear noise-to-power ratios at the frequency point to be measured according to multiple band-notch signals obtained after the multiple band-notch signals with different band-notch widths pass through the optical link; and extrapolate a real nonlinear noise-to-power ratio at the frequency point to be measured according to the multiple nonlinear noise-to-power ratios corresponding to the multiple band-notch signals with different band-notch widths.

For example, respectively calculating multiple nonlinear noise-to-power ratios at the frequency point to be measured according to multiple band-notch signals obtained after the multiple band-notch signals with different band-notch widths pass through the optical link may include measuring multiple first depths of the multiple band-notch signals obtained after the multiple band-notch signals with different band-notch widths pass through the optical link at transmit power satisfying a linear transmission condition; measuring multiple second depths of the multiple band-notch signals obtained after the multiple band-notch signals with different band-notch widths pass through the optical link at transmit power to be measured; and respectively calculating the multiple nonlinear noise-to-power ratios at the frequency point to be measured according to the multiple first depths and the multiple second depths.

For example, generating a band-notch signal may include performing band-notch processing on a transmission signal in an I-path and Q-path respectively to generate a bilateral band-notch signal; or performing band-notch processing on a complex signal to generate a unilateral band-notch signal.

For example, generating a band-notch signal may include generating the band-notch signals at the frequency point to be measured in a waveform domain or a symbol domain.

For example, generating a band-notch signal may include removing signals in a part of a range of frequency spectrum to generate the band-notch signal; or generating the band-notch signal by equal probability notch processing.

For example, generating the band-notch signal by equal probability notch processing may include making a probability distribution density of the band notch processed signal in a time domain close to or identical to a reference signal while producing a band notch at a spectrum; constructing signals of identical probability distribution densities by performing amplitude sorting, amplitude replacement and time sorting on the reference signal and an initialized seed signal; constructing an isospectral signal by slicing the spectrum and making total power within each slice equal to power of a corresponding reference signal slice; and outputting the band-notch signal when a preset condition is satisfied.

For example, extrapolating a real nonlinear noise-to-power ratio at the frequency point to be measured according to the multiple nonlinear noise-to-power ratios corresponding to the multiple band-notch signals with different band-notch widths may include, according to the multiple nonlinear noise-to-power ratios corresponding to the multiple band-notch signals with different band-notch widths, extrapolating the real nonlinear noise-to-power ratio at the frequency point to be measured under a dB unit or a linear unit.

For example, for a dual-polarization signal, band-notch signals in two polarization states are generated respectively, and real nonlinear noise-to-power ratios of the two polarization states at the frequency point to be measured are calculated.

In another embodiment, the measurement apparatus for nonlinear damages in an optical link described in embodiment 1 and the processor 2001 may be configured separately. For example, the measurement apparatus for nonlinear damages in an optical link may be configured as a chip connected to the processor 2001, and the function of the measurement apparatus for nonlinear damages in an optical link may be implemented under control of the processor 2001.

In this embodiment, the electronic device 2000 does not necessarily include all components shown in FIG. 20.

As shown in FIG. 20, the processor 2001 is sometimes referred to as a controller or an operational control, which may include a microprocessor or other processor devices and/or logic devices. The processor 2001 receives input and controls operations of components of the electronic device 2000.

The memory 2002 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2001 may execute programs stored in the memory 2002, so as to realize information storage or processing, etc. Functions of other parts are similar to those of the prior art, which shall not be described herein any further. The parts of the terminal equipment 2000 may be realized by specific hardware, firmware, software, or any combination thereof, for example, in form of one or more units, without departing from the scope of this disclosure.

In this embodiment, the electronic device may be a stand-alone device, such as a stand-alone computer, or, it may also be integrated in an optical receiver.

It can be seen from the above embodiment that multiple nonlinear noise-to-power ratios are calculated according to multiple band-notch signals obtained after multiple band-notch signals with different band-notch widths pass through the optical link, and a nonlinear noise-to-power ratio corresponding to a band-notch width of zero, i.e. a real nonlinear noise-to-power ratio, may be obtained by extrapolation based on multiple nonlinear noise-to-power ratios corresponding to multiple band-notch signals with different band-notch widths. Hence, the real nonlinear noise-to-power ratio in the optical link may be accurately measured with a simple method and existing instruments and equipments.

Embodiment 4

The embodiment of this disclosure provides a measurement method for nonlinear damages in an optical link measurement, which corresponds to the apparatus for nonlinear damages in an optical link in embodiment 1.

Figure 21:
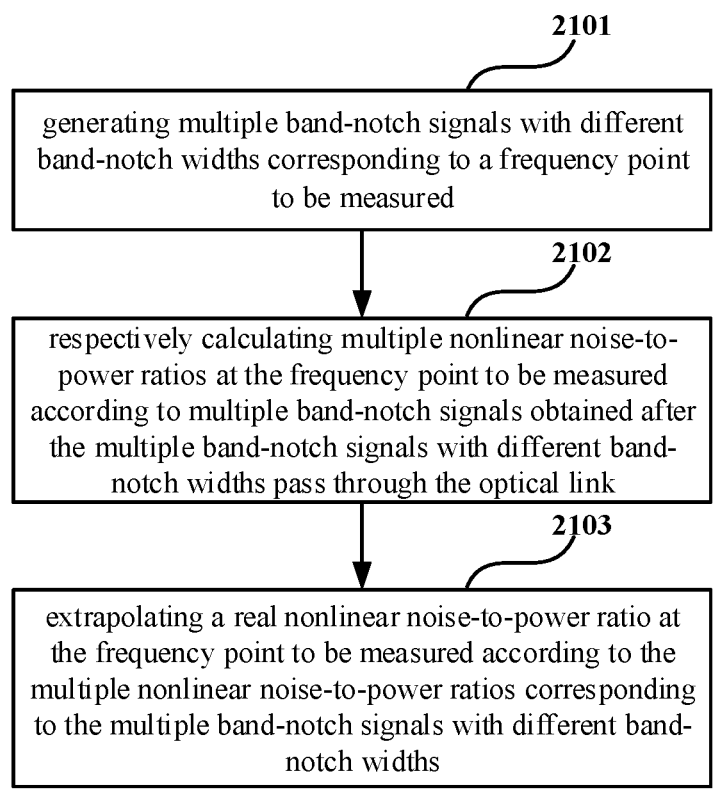
FIG. 21 is a schematic diagram of the measurement method for nonlinear damages in an optical link of embodiment 4 of this disclosure.

FIG. 21 is a schematic diagram of the measurement method for nonlinear damages in an optical link of embodiment 4 of this disclosure. As shown in FIG. 21, the method may include:

Step 2101: generating multiple band-notch signals with different band-notch widths corresponding to a frequency point to be measured.

Step 2102: respectively calculating multiple nonlinear noise-to-power ratios at the frequency point to be measured according to multiple band-notch signals obtained after the multiple band-notch signals with different band-notch widths pass through the optical link.

Step 2103: extrapolating a real nonlinear noise-to-power ratio at the frequency point to be measured according to the multiple nonlinear noise-to-power ratios corresponding to the multiple band-notch signals with different band-notch widths.

In this embodiment, reference may be made to implementations of the components in embodiment 1 for execution of the above steps, which shall not be described herein any further.

It can be seen from the above embodiment that multiple nonlinear noise-to-power ratios are calculated according to multiple band-notch signals obtained after multiple band-notch signals with different band-notch widths pass through the optical link, and a nonlinear noise-to-power ratio corresponding to a band-notch width of zero, i.e. a real nonlinear noise-to-power ratio, may be obtained by extrapolation based on multiple nonlinear noise-to-power ratios corresponding to multiple band-notch signals with different band-notch widths. Hence, the real nonlinear noise-to-power ratio in the optical link may be accurately measured with a simple method and existing instruments and equipments.

An embodiment of this disclosure provides a computer readable program, which, when executed in a measurement apparatus for nonlinear damages in an optical link or an electronic device, will cause a computer to carry out the measurement method for nonlinear damages in an optical link as described in embodiment 3 in the measurement apparatus for nonlinear damages in an optical link or the electronic device.

An embodiment of this disclosure provides a computer readable medium, including a computer readable program, which will cause a computer to carry out the measurement method for nonlinear damages in an optical link as described in embodiment 3 in a measurement apparatus for nonlinear damages in an optical link or an electronic device.

The measurement method for nonlinear damages in an optical link carried out in the measurement apparatus for nonlinear damages in an optical link or the electronic device described with reference to the embodiments of this disclosure may be directly embodied as hardware, software modules executed by a processor, or a combination thereof, for example, in form of one or more units. For example, one or more functional block diagrams and/or one or more combinations of the functional block diagrams shown FIG. 2 may either correspond to software modules of procedures of a computer program, or correspond to hardware modules. Such software modules may respectively correspond to the steps shown in FIG. 21. And the hardware module, for example, may be carried out by firming the software modules by using a field programmable gate array (FPGA).

The software modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the software modules may be stored in the MEGA-SIM card or the flash memory device of a large capacity.

One or more functional blocks and/or one or more combinations of the functional blocks in FIG. 2 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 2 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

According to the implementations disclosed in the embodiments of this disclosure, following supplements are further disclosed.

In an example, a measurement apparatus for nonlinear damages in an optical link, the apparatus may include a first generating unit configured to generate multiple band-notch signals with different band-notch widths corresponding to a frequency point to be measured; a first calculating unit configured to respectively calculate multiple nonlinear noise-to-power ratios at the frequency point to be measured according to multiple band-notch signals obtained after the multiple band-notch signals with different band-notch widths pass through the optical link; and an extrapolation unit configured to extrapolate a real nonlinear noise-to-power ratio at the frequency point to be measured according to the multiple nonlinear noise-to-power ratios corresponding to the multiple band-notch signals with different band-notch widths.

In an example, the first calculating unit may include a first measurement unit configured to measure multiple first depths of the multiple band-notch signals obtained after the multiple band-notch signals with different band-notch widths pass through the optical link at transmit power satisfying a linear transmission condition; a second measurement unit configured to measure multiple second depths of the multiple band-notch signals obtained after the multiple band-notch signals with different band-notch widths pass through the optical link at transmit power to be measured; and a second calculating unit configured to respectively calculate the multiple nonlinear noise-to-power ratios at the frequency point to be measured according to the multiple first depths and the multiple second depths.

In an example, the first generating unit may perform band-notch processing on a transmission signal in an I-path and Q-path respectively to generate a bilateral band-notch signal; or perform band-notch processing on a complex signal to generate a unilateral band-notch signal.

In an example, the first generating unit may generate the band-notch signals at the frequency point to be measured in a waveform domain or a symbol domain.

In an example, the first generating unit may include a second generating unit configured to remove signals in a part of a range of frequency spectrum to generate the band-notch signal; or a third generating unit configured to generate the band-notch signal by equal probability notch processing.

In an example, the third generating unit may include a producing unit configured to make a probability distribution density of the band notch processed signal in a time domain close to or identical to a reference signal while producing a band notch at a spectrum; a sorting unit configured to construct signals of identical probability distribution densities by performing amplitude sorting, amplitude replacement and time sorting on the reference signal and an initialized seed signal; an isospectral unit configured to construct an isospectral signal by slicing the spectrum and making total power within each slice equal to power of a corresponding reference signal slice; and an output unit configured to output the band-notch signal when a preset condition is satisfied.

In an example, according to the multiple nonlinear noise-to-power ratios corresponding to the multiple band-notch signals with different band-notch widths, the extrapolation unit may extrapolates the real nonlinear noise-to-power ratio at the frequency point to be measured under a dB unit or a linear unit.

In an example, for a dual-polarization signal, the apparatus generates band-notch signals in two polarization states respectively, and calculates real nonlinear noise-to-power ratios of the two polarization states at the frequency point to be measured.

In an example, the number of the frequency point to be measured is one or more.

In an example, an apparatus for estimating performance of a nonlinear system, wherein the apparatus may include the measurement apparatus for nonlinear damages in an optical link described in any one of the above supplements, to obtain real nonlinear noise-to-power ratios at frequency points to be measured; a modeling unit configured to establish an equivalent additive noise model according to the real nonlinear noise-to-power ratios at the frequency points to be measured; and an estimation unit configured to estimate the performance of the nonlinear system according to the equivalent additive noise model.

In an example, an electronic device may include an apparatus as described in the above supplements.

in an example, a measurement method for nonlinear damages in an optical link, the method may include generating multiple band-notch signals with different band-notch widths corresponding to a frequency point to be measured; respectively calculating multiple nonlinear noise-to-power ratios at the frequency point to be measured according to multiple band-notch signals obtained after the multiple band-notch signals with different band-notch widths pass through the optical link; and extrapolating a real nonlinear noise-to-power ratio at the frequency point to be measured according to the multiple nonlinear noise-to-power ratios corresponding to the multiple band-notch signals with different band-notch widths.

In an example, respectively calculating multiple nonlinear noise-to-power ratios at the frequency point to be measured according to multiple band-notch signals obtained after the multiple band-notch signals with different band-notch widths pass through the optical link may include measuring multiple first depths of the multiple band-notch signals obtained after the multiple band-notch signals with different band-notch widths pass through the optical link at transmit power satisfying a linear transmission condition; measuring multiple second depths of the multiple band-notch signals obtained after the multiple band-notch signals with different band-notch widths pass through the optical link at transmit power to be measured; and respectively calculating the multiple nonlinear noise-to-power ratios at the frequency point to be measured according to the multiple first depths and the multiple second depths.

In an example, generating a band-notch signal may include performing band-notch processing on a transmission signal in an I-path and Q-path respectively to generate a bilateral band-notch signal; or performing band-notch processing on a complex signal to generate a unilateral band-notch signal.

In an example, generating a band-notch signal may include generating the band-notch signals at the frequency point to be measured in a waveform domain or a symbol domain.

In an example, generating a band-notch signal may include removing signals in a part of a range of frequency spectrum to generate the band-notch signal; or generating the band-notch signal by equal probability notch processing.

In an example, generating the band-notch signal by equal probability notch processing may include making a probability distribution density of the band notch processed signal in a time domain close to or identical to a reference signal while producing a band notch at a spectrum; constructing signals of identical probability distribution densities by performing amplitude sorting, amplitude replacement and time sorting on the reference signal and an initialized seed signal; constructing an isospectral signal by slicing the spectrum and making total power within each slice equal to power of a corresponding reference signal slice; and outputting the band-notch signal when a preset condition is satisfied.

In an example, extrapolating a real nonlinear noise-to-power ratio at the frequency point to be measured according to the multiple nonlinear noise-to-power ratios corresponding to the multiple band-notch signals with different band-notch widths may include, according to the multiple nonlinear noise-to-power ratios corresponding to the multiple band-notch signals with different band-notch widths, extrapolating the real nonlinear noise-to-power ratio at the frequency point to be measured under a dB unit or a linear unit.

In an example, for a dual-polarization signal, band-notch signals in two polarization states are generated respectively, and real nonlinear noise-to-power ratios of the two polarization states at the frequency point to be measured are calculated.

In an example, the number of the frequency point to be measured is one or more.

In an example, a method for estimating performance of a nonlinear system, may include obtaining real nonlinear noise-to-power ratios at frequency points to be measured according to the measurement method for nonlinear damages in an optical link described in any one of the above supplements; establishing an equivalent additive noise model according to the real nonlinear noise-to-power ratios at the frequency points to be measured; and estimating the performance of the nonlinear system according to the equivalent additive noise model.

The invention claimed is:

1. An apparatus to measure nonlinear damages in an optical link, comprising:
   a memory; and
   a processor coupled to the memory and to control execution of a process to,
      generate respective multiple band-notch signals with different band-notch widths corresponding to a frequency point to be measured;
      calculate respective multiple nonlinear noise-to-power ratios at the frequency point to be measured, according to the respective multiple band-notch signals obtained after the respective multiple band-notch signals with different band-notch widths pass through the optical link; and
      extrapolate a real nonlinear noise-to-power ratio at the frequency point to be measured, according to the respective multiple nonlinear noise-to-power ratios corresponding to the respective multiple band-notch signals with different band-notch widths.

2. The apparatus according to claim 1, wherein to calculate the respective multiple nonlinear noise-to-power ratios, the process is to:
   measure multiple first depths of the respective multiple band-notch signals obtained after the respective multiple band-notch signals with different band-notch widths pass through the optical link at a transmit power satisfying a linear transmission condition;
   measure multiple second depths of the respective multiple band-notch signals obtained after the respective multiple band-notch signals with different band-notch widths pass through the optical link at a transmit power to be measured; and calculate the respective multiple nonlinear noise-to-power ratios at the frequency point to be measured according to the multiple first depths and the multiple second depths.

3. The apparatus according to claim 1, wherein to generate the respective multiple band-notch signals, the process is to,
perform band-notch processing on a transmission signal in an I-path and Q-path respectively to generate a bilateral band-notch signal among the respective multiple band-notch signals; or perform band-notch processing on a complex signal to generate a unilateral band-notch signal among the respective multiple band-notch signals.

4. The apparatus according to claim 1, the respective multiple band-notch signals are generated at the frequency point to be measured in a waveform domain or a symbol domain.

5. The apparatus according to claim 1, wherein to generate the respective multiple band-notch signals, the process is to,
remove signals in a part of a range of frequency spectrum to generate a band-notch signal among the respective multiple band-notch signals; or
generate a band-notch signal, from among the respective multiple band-notch signals, by equal probability notch processing.

6. The apparatus according to claim 5, to generate the band-notch signal by equal probability notch processing, the process is to,
make a probability distribution density of the band notch processed signal in a time domain close to or identical to a reference signal while producing a band notch at a spectrum;
construct signals of identical probability distribution densities by performing amplitude sorting, amplitude replacement and time sorting on the reference signal and an initialized seed signal;
construct an isospectral signal by slicing the spectrum and making total power within each slice equal to power of a corresponding reference signal slice; and
output the band-notch signal when a condition is satisfied.

7. The apparatus according to claim 1, wherein the real nonlinear noise-to-power ratio is extrapolated at the frequency point to be measured under a dB unit or a linear unit.

8. The apparatus according to claim 1, wherein,
for a dual-polarization signal, the process is to generate band-notch signals in two polarization states respectively, and calculate real nonlinear noise-to-power ratios of the two polarization states at the frequency point to be measured.

9. An apparatus to estimate performance of a nonlinear system, comprising:
the measurement apparatus for nonlinear damages in an optical link as claimed in claim 1, to obtain real nonlinear noise-to-power ratios at frequency points to be measured;
a processor to control execution of a process to,
establish an equivalent additive noise model according to the real nonlinear noise-to-power ratios at the frequency points to be measured; and
estimate the performance of the nonlinear system according to the equivalent additive noise model.

10. An electronic device, including the apparatus as claimed in claim 1.

* * * * *